US012429210B2

(12) United States Patent
Huang

(10) Patent No.: US 12,429,210 B2
(45) Date of Patent: Sep. 30, 2025

(54) ALARM CLOCK

(71) Applicant: Shenzhen Bohui Technology Co., Ltd., Shenzhen (CN)

(72) Inventor: Xiaoqiang Huang, Shenzhen (CN)

(73) Assignee: Shenzhen Bohui Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/670,200

(22) Filed: May 21, 2024

(65) Prior Publication Data

US 2025/0076824 A1 Mar. 6, 2025

(51) Int. Cl.

| | |
|---|---|
| ***F21V 33/00*** | (2006.01) |
| ***F21S 6/00*** | (2006.01) |
| ***F21V 1/02*** | (2006.01) |
| ***F21V 1/04*** | (2006.01) |
| ***F21V 17/12*** | (2006.01) |
| ***F21V 19/00*** | (2006.01) |
| ***F21V 21/10*** | (2006.01) |
| ***F21V 23/04*** | (2006.01) |
| ***F21Y 115/10*** | (2016.01) |
| ***G04G 13/02*** | (2006.01) |
| ***G04R 20/26*** | (2013.01) |

(52) U.S. Cl.

CPC .......... *F21V 33/0024* (2013.01); *F21S 6/003* (2013.01); *F21V 1/02* (2013.01); *F21V 1/04* (2013.01); *F21V 17/12* (2013.01); *F21V 19/0065* (2013.01); *F21V 21/10* (2013.01); *F21V 23/04* (2013.01); *F21V 33/0004* (2013.01); *G04G 13/021* (2013.01); *G04R 20/26* (2013.01); *F21Y 2115/10* (2016.08)

(58) Field of Classification Search

CPC ........ G04R 20/26; G04C 17/02; G04C 19/02; G04B 23/02

See application file for complete search history.

(56) References Cited

U.S. PATENT DOCUMENTS

| | | | | |
|---|---|---|---|---|
| 4,301,524 A * | 11/1981 | Koepp | G04G 13/026 | 368/251 |
| 6,236,622 B1 * | 5/2001 | Blackman | G04G 11/00 | 368/79 |
| 6,678,215 B1 * | 1/2004 | Treyz | G04G 13/028 | 368/10 |

(Continued)

OTHER PUBLICATIONS

Translation of CN 108051997 (Year: 2018).*
Translation of CN 105020626 (Year: 2015).*

*Primary Examiner* — Edwin A. Leon
*Assistant Examiner* — Jason M Collins

(57) ABSTRACT

An alarm clock includes a control main board, an alarm clock module, a short-distance wireless communication module and a clock module. The alarm clock module is electrically connected to the control main board. The short-distance wireless communication module is electrically connected to the control main board. The short-distance wireless communication module is configured for wireless connection with an external electronic device. The clock module is configured for displaying time. The clock module is electrically connected to the control main board and the short-distance wireless communication module. The clock module is wirelessly connected to the external electronic device via the short-distance wireless communication module for automatic time calibration.

16 Claims, 6 Drawing Sheets

(56) References Cited

U.S. PATENT DOCUMENTS

| | | | | |
|---|---|---|---|---|
| 8,545,039 | B2 * | 10/2013 | Patel | H01R 25/003 362/183 |
| 10,873,191 | B2 * | 12/2020 | Chien | F21V 23/02 |
| 11,946,635 | B1 * | 4/2024 | Huang | G04G 21/04 |
| 2005/0058026 | A1 * | 3/2005 | Hocherman | G04G 13/026 368/73 |
| 2007/0159306 | A1 * | 7/2007 | Smith | G04G 21/06 368/244 |
| 2009/0285056 | A1 * | 11/2009 | Scott | G04G 9/0076 368/21 |
| 2016/0170381 | A1 * | 6/2016 | Mininger | G04G 13/026 368/10 |
| 2016/0327915 | A1 * | 11/2016 | Katzer | G04C 3/002 |
| 2016/0363912 | A1 * | 12/2016 | Ashkenazi | G04G 13/021 |
| 2017/0060098 | A1 * | 3/2017 | Yonekura | G04R 20/30 |
| 2020/0091746 | A1 * | 3/2020 | Chien | G06F 1/266 |
| 2020/0372829 | A1 * | 11/2020 | Ostler | G04G 9/0064 |

* cited by examiner

ALARM CLOCK

CROSS-REFERENCE TO RELATED APPLICATIONS

The application claims priority of American patent application Ser. No. 18/457,266, filed on Aug. 28, 2023, which is incorporated herein by reference in its entireties.

TECHNICAL FIELD

The present invention relates to the field of alarm clocks, in particular to an alarm clock.

BACKGROUND ART

In modern life, an alarm clock is an essential household product for people's daily use. The alarm clock is a clock with an alarm device that can indicate time and emit a sound signal or other signals according to people's pre-set time. With the progress of science and technology, most alarm clocks nowadays display time in a digital and electronic manner. However, due to factors such as errors of electronic components and changes in operating environment temperature, the time accuracy of current electronic alarm clocks is generally not very accurate. A better electronic alarm clock has an error margin of 10 seconds per month, which is basically not very accurate. Due to errors in the time or the time being disrupted by a user's adjustment, the time of the digital alarm clock is often inaccurate.

SUMMARY

In order to overcome the shortcomings of the prior art, an alarm clock is provided in the present invention that can automatically calibrate the time of the clock in the alarm clock via short-distance wireless communication.

The technical solution adopted in the present invention is as follows.

An alarm clock is provided in the present invention, including: a control main board; an alarm clock module, the alarm clock module being electrically connected to the control main board; a short-distance wireless communication module, the short-distance wireless communication module being electrically connected to the control main board, and the short-distance wireless communication module being configured for wireless connection with an external electronic device; and a clock module, the clock module being configured for displaying time, the clock module being electrically connected to the control main board and the short-distance wireless communication module, and the clock module being wirelessly connected to the external electronic device via the short-distance wireless communication module for automatic time calibration.

As an improvement of the present invention, the short-distance wireless communication module includes a WiFi connection module, a Bluetooth connection module, an infrared connection module, a ZigBee connection module, or an NFC connection module.

As an improvement of the present invention, the alarm clock includes a power button. The power button is electrically connected to the control main board. The power button includes a first working state and a second working state.

As an improvement of the present invention, when the power button is triggered to be in the first working state, the power button is used for controlling the clock module to be turned on and turned off. When the clock module is turned on, the clock module is wirelessly connected to the external electronic device via the short-distance wireless communication module to achieve automatic time calibration.

As an improvement of the present invention, the alarm clock module includes at least two working modes.

As an improvement of the present invention, the alarm clock further includes a toggle button group. The toggle button group is electrically connected to the control main board and the alarm clock module. The toggle button group includes a third working state and a fourth working state.

As an improvement of the present invention, the toggle button group includes a first toggle button and a second toggle button. The alarm clock module includes a first working mode and a second working mode. When the toggle button group is triggered to be in the third working state, the first toggle button is used for switching to the first working mode, and the second toggle button is used for switching to the second working mode.

As an improvement of the present invention, the toggle button group further includes a third toggle button and a fourth toggle button. The first working mode includes at least two first alarm clock settings. The first alarm clock settings include a first workday setting and a first non-workday setting. The third toggle button and the fourth toggle button are used for switching different alarm clock settings of the first working mode.

As an improvement of the present invention, the second working mode includes at least two second alarm clock settings. The second alarm clock settings include a second workday setting and a second non-workday setting. The third toggle button and the fourth toggle button are used for switching different alarm clock settings of the second working mode.

As an improvement of the present invention, the alarm clock further includes a speaker. The speaker is electrically connected to the control main board and the short-distance wireless communication module. The speaker is configured for playing an audio file. When the toggle button group is triggered to be in the fourth working state, the first toggle button and the second toggle button are respectively used for adjusting sound volume emitted by the speaker.

As an improvement of the present invention, the alarm clock further includes a light-emitting element and a touch switch. The touch switch is electrically connected to the control main board, and the touch switch is used for controlling brightness of the light-emitting element.

As an improvement of the present invention, the light-emitting element is equipped with three levels of brightness. When the touch switch is touched for the first time, the light-emitting element is turned on at a first level of brightness. When the touch switch is touched for the second time, the light-emitting element is turned on at a second level of brightness. When the touch switch is touched for the third time, the light-emitting element is turned on at a third level of brightness. When the touch switch is touched for the fourth time, the light-emitting element is turned off.

As an improvement of the present invention, the alarm clock further includes an LED display screen. The LED display screen is electrically connected to the control main board. When the power button is triggered to be in the second working state, the power button can be used for turning on or turning off the LED display screen and adjusting brightness of the LED display screen.

As an improvement of the present invention, the alarm clock includes a base. The base is connected to a lamp post. One end of the lamp post is connected to the base, and an opposite end of the lamp post is connected to a bulb base.

The bulb base is connected to a bulb, and the light-emitting element is arranged inside the bulb.

As an improvement of the present invention, the control main board is installed inside the base, and the LED display screen is installed on an outer side wall of the base. The speaker is installed on an upper surface of the base.

As an improvement of the present invention, the base is further provided with a USB power interface and a Type-C power interface. The USB power interface and the Type-C power interface are positioned on the outer side wall of the base.

As an improvement of the present invention, the alarm clock further includes a lampshade and a lamp cap nut. The lamp cap nut is configured for fixedly connecting the lampshade to the bulb base. The bulb is detachably plugged into the bulb base through threaded connection. The lampshade encloses the bulb base and the bulb.

As an improvement of the present invention, the lampshade is internally connected with a plurality of connecting rods. One end of each of the connecting rods is fixedly connected to the lampshade, and an opposite end of each of the connecting rods is connected to a connecting structure. The connecting structure includes two layers of annular fixing pieces. The connecting rods are fixedly connected between the two layers of annular fixing pieces. The connecting structure can be sleeved and connected to the bulb base. The connecting structure is fixedly installed on the bulb base through threaded connection via the lamp cap nut, so that the lampshade is connected to the bulb base and encloses the bulb base and the bulb.

As an improvement of the present invention, the bulb base is equipped with a flange. When the connecting structure sleeves the bulb base, bottom surfaces of the two layers of annular fixing pieces are connected to a surface of the flange, so that the lampshade can be fixedly connected to the bulb base.

Beneficial effects: the alarm clock is provided in the present invention, including the control main board, the alarm clock module, the short-distance wireless communication module, and the clock module. The alarm clock module is electrically connected to the control main board. The short-distance wireless communication module is electrically connected to the control main board, and the short-distance wireless communication module is configured for wireless connection with the external electronic device. The clock module is configured for displaying time. The clock module is electrically connected to the control main board and the short-distance wireless communication module. The clock module is wirelessly connected to the external electronic device via the short-distance wireless communication module for automatic time calibration. Through the above structure, the clock module in the alarm clock is capable of automatically calibrating the time after being wirelessly connected to the external electronic device via the short-distance wireless communication module. The automatic time calibration ensures that the clock's time is synchronized with a standard time, and a user does not need to manually intervene or adjust the time, eliminating tedious steps of adjusting and setting the time, thereby providing a convenient user experience. Moreover, using the short-distance wireless communication for automatic calibration can maintain stable connection, improving the stability of time calibration, thereby bringing the user a more intelligent and convenient life experience.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
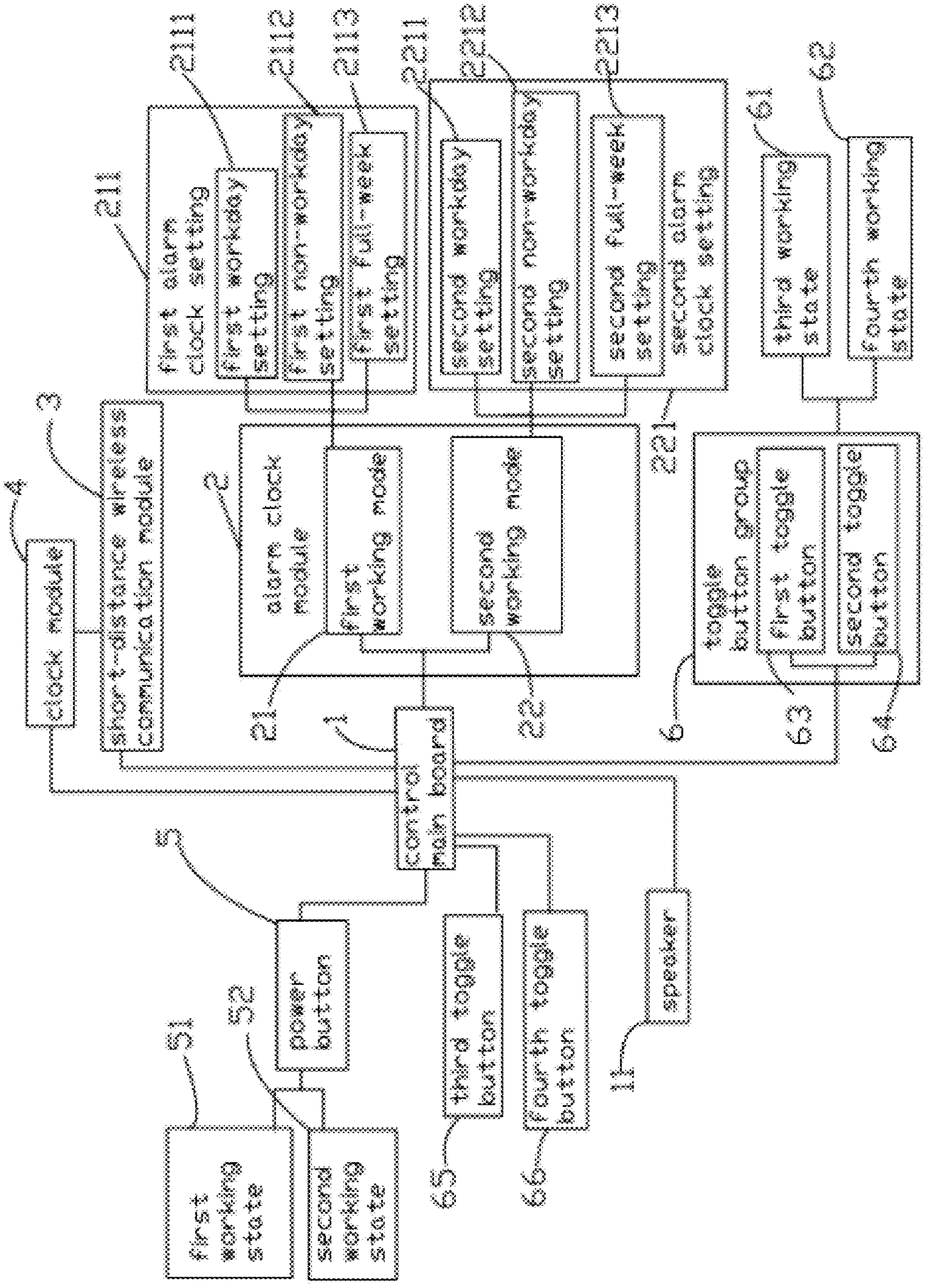
FIG. 1 is a block diagram of embodiment one according to the present invention.
Figure 2:
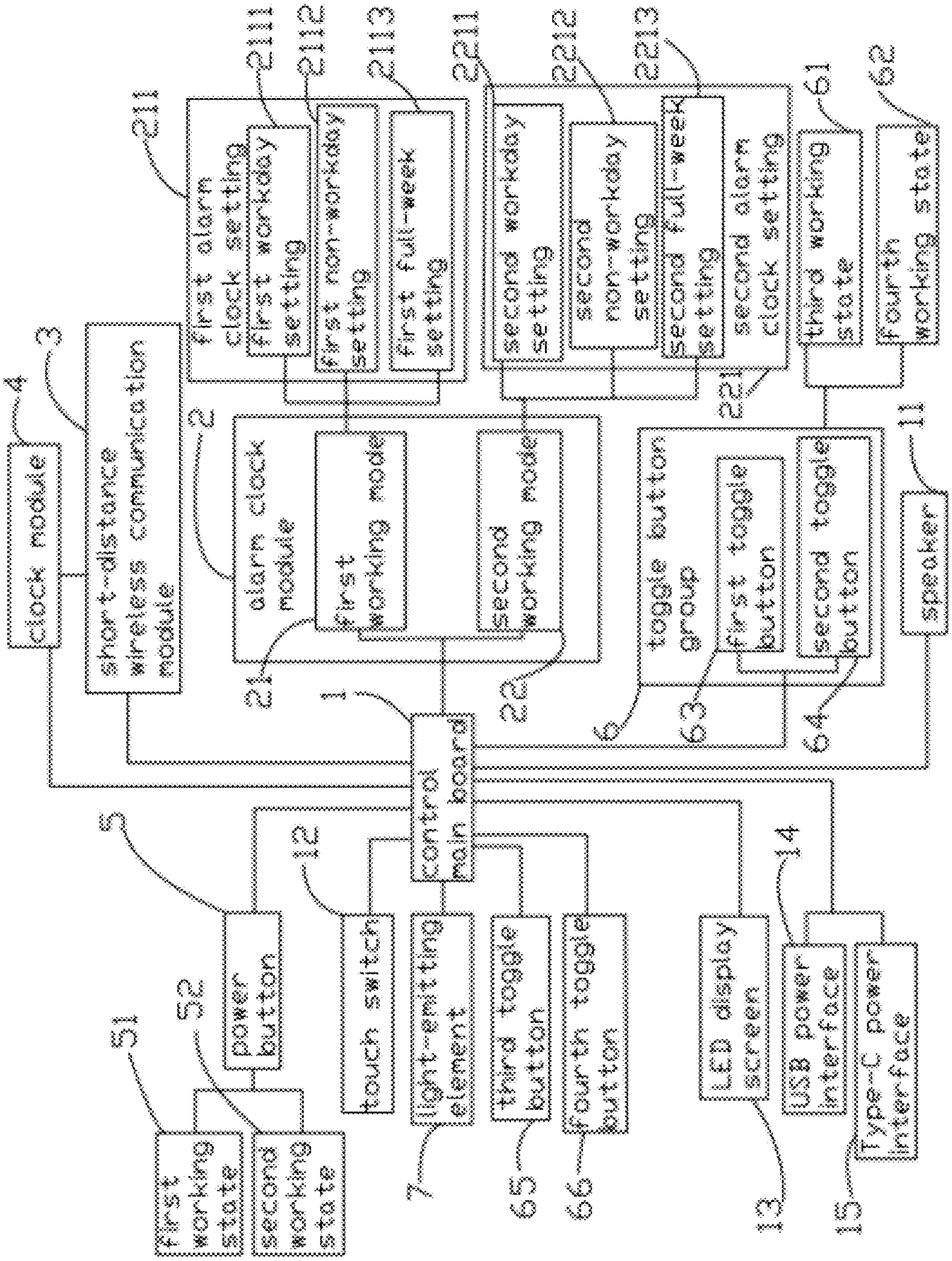
FIG. 2 is a block diagram of embodiment two according to the present invention.
Figure 3:
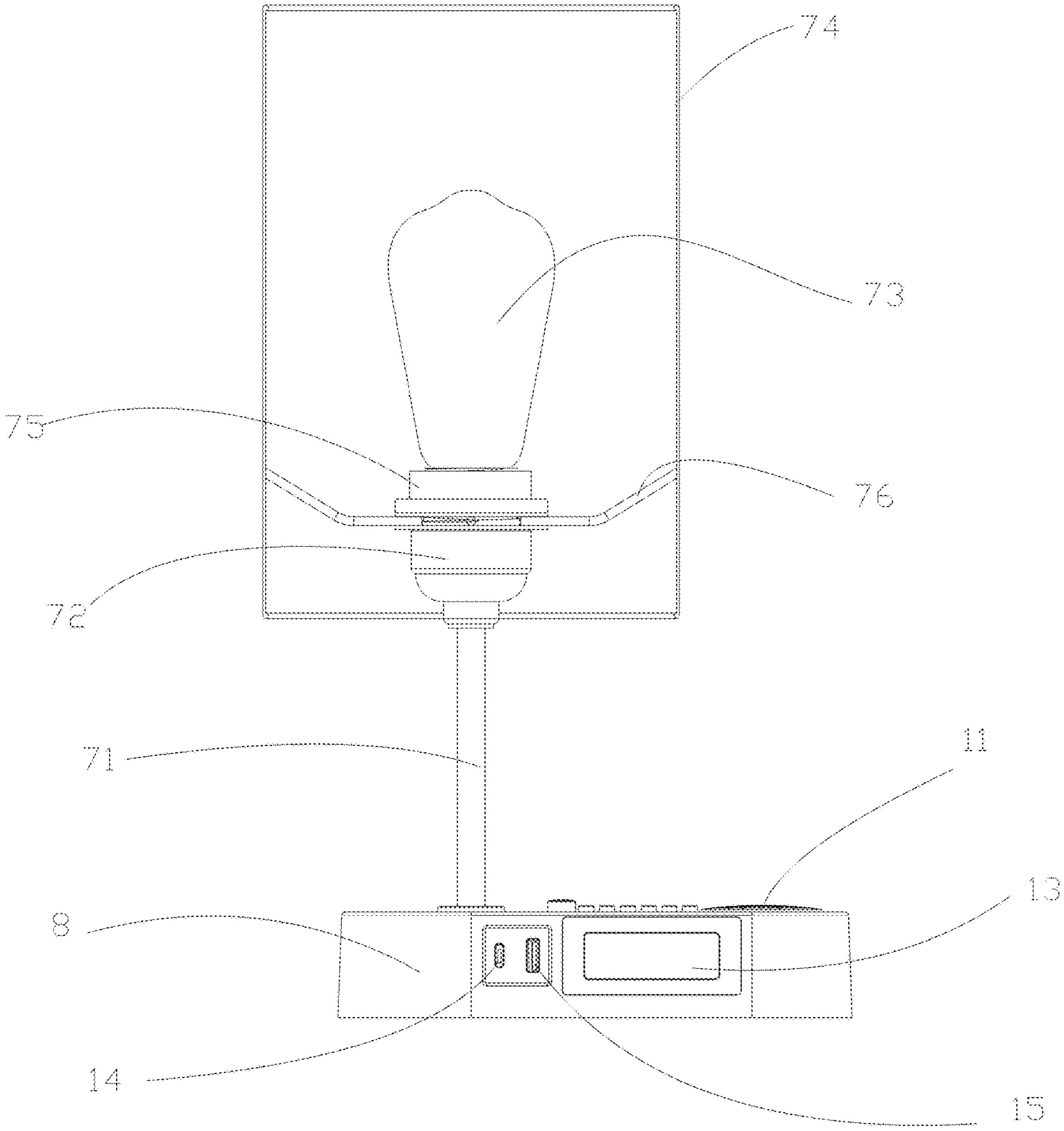
FIG. 3 is a schematic diagram of an overall structure of embodiment two according to the present invention.
Figure 4:
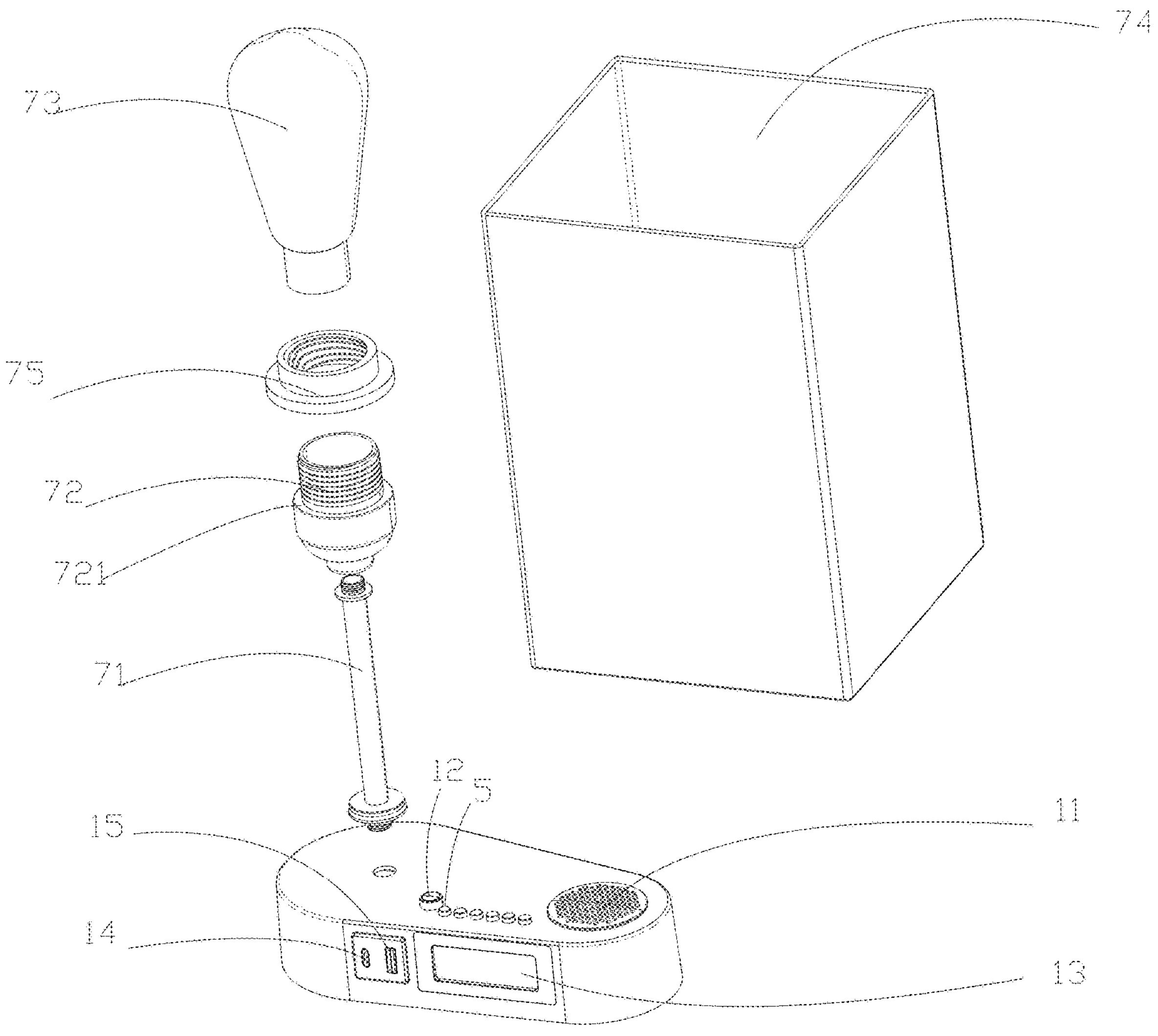
FIG. 4 is an exploded view of an overall structure of embodiment two according to the present invention.
Figure 5:
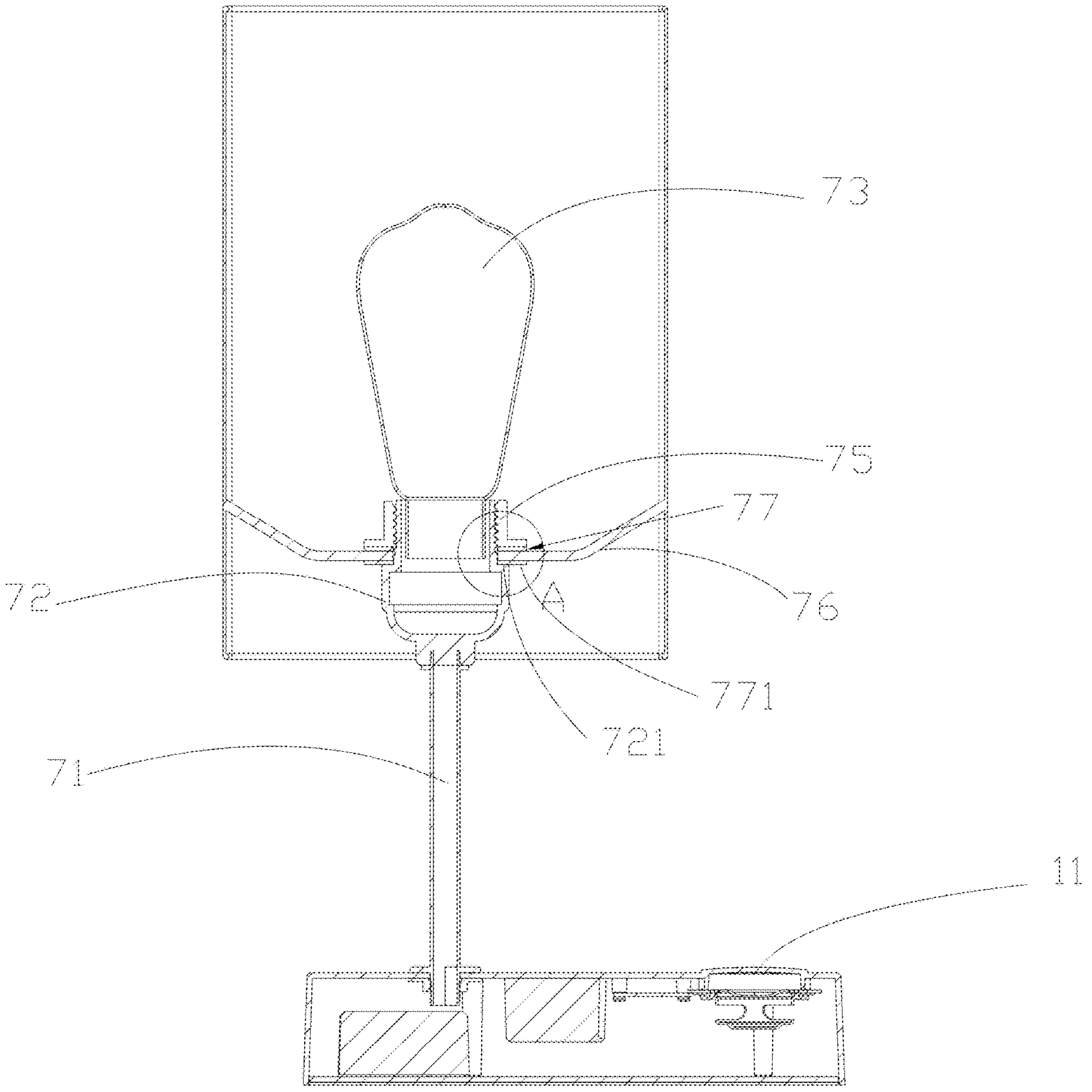
FIG. 5 is a sectional view of an overall structure of embodiment two according to the present invention.
Figure 6:
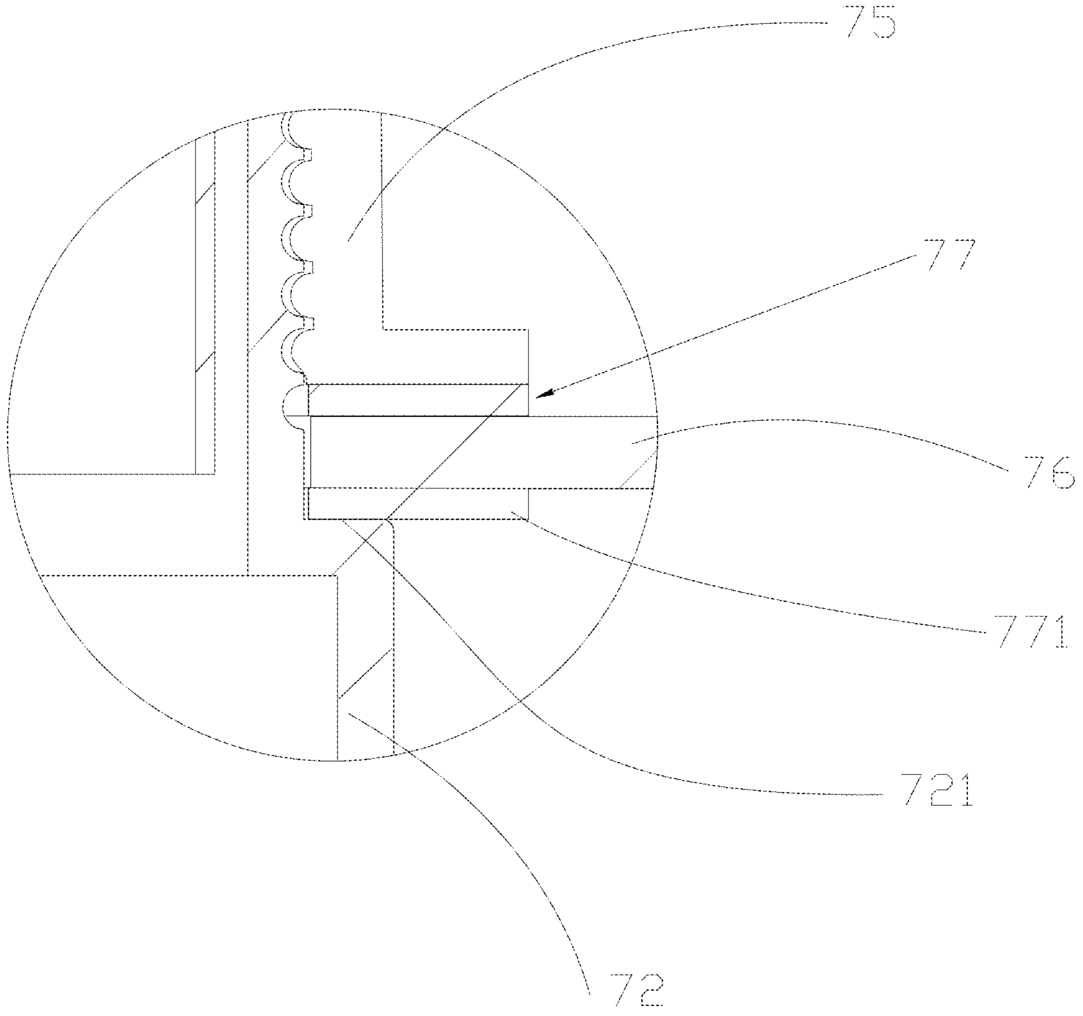
FIG. 6 is an enlarged view of area A in FIG. 5.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Embodiment One

Referring to FIG. 1, an alarm clock includes: a control main board 1; an alarm clock module 2, the alarm clock module 2 being electrically connected to the control main board 1; a short-distance wireless communication module 3, the short-distance wireless communication module 3 being electrically connected to the control main board 1, and the short-distance wireless communication module 3 being configured for wireless connection with an external electronic device; and a clock module 4, the clock module 4 being configured for displaying time, the clock module 4 being electrically connected to the control main board 1 and the short-distance wireless communication module 3, and the clock module 4 being wirelessly connected to the external electronic device via the short-distance wireless communication module 3 for automatic time calibration. Through the above structure, the clock module 4 in the alarm clock is capable of automatically calibrating the time after being wirelessly connected to the external electronic device via the short-distance wireless communication module 3. The automatic time calibration ensures that the clock's time is synchronized with a standard time, and a user does not need to manually intervene or adjust the time, eliminating tedious steps of adjusting and setting the time, thereby providing a convenient user experience. Moreover, using the short-distance wireless communication for automatic calibration can maintain stable connection, improving the stability of time calibration, thereby bringing the user a more intelligent and convenient life experience.

In this embodiment, the short-distance wireless communication module 3 includes a WiFi connection module, a Bluetooth connection module, an infrared connection module, a ZigBee connection module, or an NFC connection module. Specifically, in this embodiment, a Bluetooth communication connection technology can be used to achieve a short-distance wireless connection between the alarm clock and the external electronic device. The external device can be a mobile phone, a tablet, a computer, a television and other electronic devices that can connect to the Internet. When the alarm clock is connected to the electronic device through Bluetooth, the clock module is capable of obtaining the accurate time of the Internet and then conducting automatic calibration, achieving wireless short-distance communication time adjustment of the alarm clock, thereby improving an intelligent design of the alarm clock.

In this embodiment, the alarm clock includes a power button 5. The power button 5 is electrically connected to the control main board 1. The power button 5 includes a first working state 51 and a second working state 52. When the power button 5 is triggered to be in the first working state 51, the power button 5 is used for controlling the clock module 4 to be turned on and turned off. When the clock module 4 is turned on, the clock module 4 is wirelessly connected to the external electronic device via the short-distance wireless communication module 3 to achieve automatic time calibration. Through the above structure, making a short press on the power button 5 can achieve a switch of the first working state 51 or the second working state 52. By making a short press on the power button 5 to enter the first working state 51, the user can control the clock module 4 to be turned on or turned off, so as to achieve the wireless connection between the clock module 4 and the electronic device via the short-distance wireless communication module 3, thereby achieving automatic time calibration.

In this embodiment, the alarm clock module 2 includes at least two working modes.

In this embodiment, the alarm clock further includes a toggle button group 6. The toggle button group 6 is electrically connected to the control main board 1 and the alarm clock module 2. The toggle button group 6 includes a third working state 61 and a fourth working state 62.

Furthermore, the toggle button group 6 includes a first toggle button 63 and a second toggle button 64. The alarm clock module 2 includes a first working mode 21 and a second working mode 22. When the toggle button group 6 is triggered to be in the third working state 61, the first toggle button 63 is used for switching to the first working mode 21, and the second toggle button 64 is used for switching to the second working mode 22. Specifically, a long press is made on the first toggle button 63 to enter the third working state 61. Then, the first toggle button 63 can be used for setting the first working mode 21, and the second toggle button 64 can be used for setting the second working mode 22. Through the above structure, the user can set different alarm clock modes by making a long press on the first toggle button 63 and the second toggle button 64, effectively achieving a function of setting two alarm clocks at different time for a desk lamp.

Furthermore, the toggle button group 6 further includes a third toggle button 65 and a fourth toggle button 66. The first working mode 21 includes at least two first alarm clock settings 211. The first alarm clock settings 211 include a first workday setting 2111 and a first non-workday setting 2112. The third toggle button 65 and the fourth toggle button 66 are used for switching different alarm clock settings of the first working mode 21. The first alarm clock settings 211 further include a first full-week setting 2113. Furthermore, the first workday setting 2111 is from Monday to Friday, the first non-workday setting 2112 is from Saturday to Sunday, and the first full-week setting 2113 is from Monday to Sunday. Specifically, a short press is made on the third toggle button 65 or the fourth toggle button 66 to select different settings. After a setting is selected, a short press is made again on the third toggle button 65 or the fourth toggle button 66 to select time and stay for 3 seconds, thereby completing the setting of the first working mode 21.

Furthermore, the second working mode 22 includes at least two second alarm clock settings 221. The second alarm clock settings 221 include a second workday setting 2211 and a second non-workday setting 2212. The third toggle button 65 and the fourth toggle button 66 are used for switching different alarm clock settings of the second working mode 22. The second alarm clock settings 221 further include a second full-week setting 2213. Furthermore, the second workday setting 2211 is from Monday to Friday, the second non-workday setting 2212 is from Saturday to Sunday, and the second full-week setting 2213 is from Monday to Sunday. Specifically, a short press is made on the third toggle button 65 or the fourth toggle button 66 to select different settings. After a setting is selected, a short press is made again on the third toggle button 65 or the fourth toggle button 66 to select time and stay for 3 seconds, thereby completing the setting of the second working mode 22.

In this embodiment, the alarm clock further includes a speaker 11. The speaker 11 is electrically connected to the control main board 1 and the short-distance wireless communication module 3. The speaker 11 is configured for playing an audio file. When the toggle button group 6 is triggered to be in the fourth working state 62, the first toggle button 63 and the second toggle button 64 are respectively used for adjusting sound volume emitted by the speaker 11. Through the above structure, when the alarm clock is wirelessly connected to the external electronic device via the short-distance wireless communication module 3, the control main board can control the speaker 11 to play the audio file, such as playing music or audio from the mobile phone, the tablet, the computer, or the television. Moreover, after a short press is made on the first toggle button 63 to enter the fourth working state, the sound volume emitted by the speaker 11 can be adjusted via the first toggle button 63 or the second toggle button 64, achieving the multifunctionality of the alarm clock and bringing the user a more intelligent and convenient life experience.

Embodiment Two

Referring to FIGS. 2-6, an alarm clock includes: a control main board 1; an alarm clock module 2, the alarm clock module 2 being electrically connected to the control main board 1; a short-distance wireless communication module 3, the short-distance wireless communication module 3 being electrically connected to the control main board 1, and the short-distance wireless communication module 3 being configured for wireless connection with an external electronic device; and a clock module 4, the clock module 4 being configured for displaying time, the clock module 4 being electrically connected to the control main board 1 and the short-distance wireless communication module 3, and the clock module 4 being wirelessly connected to the external electronic device via the short-distance wireless communication module 3 for automatic time calibration. Through the above structure, the clock module 4 in the alarm clock is capable of automatically calibrating the time after being wirelessly connected to the external electronic device via the short-distance wireless communication module 3. The automatic time calibration ensures that the clock's time is synchronized with a standard time, and a user does not need to manually intervene or adjust the time, eliminating tedious steps of adjusting and setting the time, thereby providing a convenient user experience. Moreover, using the short-distance wireless communication for automatic calibration can maintain stable connection, improving the stability of time calibration, thereby bringing the user a more intelligent and convenient life experience.

In this embodiment, the short-distance wireless communication module 3 includes a WiFi connection module, a Bluetooth connection module, an infrared connection module, a ZigBee connection module, or an NFC connection module. Specifically, in this embodiment, a Bluetooth communication connection technology can be used to achieve a short-distance wireless connection between the alarm clock and the external electronic device. The external device can be a mobile phone, a tablet, a computer, a television and other electronic devices that can connect to the Internet. When the alarm clock is connected to the electronic device through Bluetooth, the clock module is capable of obtaining the accurate time of the Internet and then conducting automatic calibration, achieving wireless short-distance communication time adjustment of the alarm clock, thereby improving an intelligent design of the alarm clock.

In this embodiment, the alarm clock includes a power button 5. The power button 5 is electrically connected to the control main board 1. The power button 5 includes a first working state 51 and a second working state 52. When the power button 5 is triggered to be in the first working state 51, the power button 5 is used for controlling the clock module 4 to be turned on and turned off. When the clock module 4 is turned on, the clock module 4 is wirelessly connected to the external electronic device via the short-distance wireless communication module 3 to achieve automatic time calibration. Through the above structure, making a short press on the power button 5 can achieve a switch of the first working state 51 or the second working state 52. By making a short press on the power button 5 to enter the first working state 51, the user can control the clock module 4 to be turned on or turned off, so as to achieve the wireless connection between the clock module 4 and the electronic device via the short-distance wireless communication module 3, thereby achieving automatic time calibration.

In this embodiment, the alarm clock module 2 includes at least two working modes.

In this embodiment, the alarm clock further includes a toggle button group 6. The toggle button group 6 is electrically connected to the control main board 1 and the alarm clock module 2. The toggle button group 6 includes a third working state 61 and a fourth working state 62.

Furthermore, the toggle button group 6 includes a first toggle button 63 and a second toggle button 64. The alarm clock module 2 includes a first working mode 21 and a second working mode 22. When the toggle button group 6 is triggered to be in the third working state 61, the first toggle button 63 is used for switching to the first working mode 21, and the second toggle button 64 is used for switching to the second working mode 22. Specifically, a long press is made on the first toggle button 63 to enter the third working state 61. Then, the first toggle button 63 can be used for setting the first working mode 21, and the second toggle button 64 can be used for setting the second working mode 22. Through the above structure, the user can set different alarm clock modes by making a long press on the first toggle button 63 and the second toggle button 64, effectively achieving a function of setting two alarm clocks at different time for a desk lamp.

Furthermore, the toggle button group 6 further includes a third toggle button 65 and a fourth toggle button 66. The first working mode 21 includes at least two first alarm clock settings 211. The first alarm clock settings 211 include a first workday setting 2111 and a first non-workday setting 2112. The third toggle button 65 and the fourth toggle button 66 are used for switching different alarm clock settings of the first working mode 21. The first alarm clock settings 211 further include a first full-week setting 2113. Furthermore, the first workday setting 2111 is from Monday to Friday, the first non-workday setting 2112 is from Saturday to Sunday, and the first full-week setting 2113 is from Monday to Sunday. Specifically, a short press is made on the third toggle button 65 or the fourth toggle button 66 to select different settings. After a setting is selected, a short press is made again on the third toggle button 65 or the fourth toggle button 66 to select time and stay for 3 seconds, thereby completing the setting of the first working mode 21.

Furthermore, the second working mode 22 includes at least two second alarm clock settings 221. The second alarm clock settings 221 include a second workday setting 2211 and a second non-workday setting 2212. The third toggle button 65 and the fourth toggle button 66 are used for switching different alarm clock settings of the second working mode 22. The second alarm clock settings 221 further include a second full-week setting 2213. Furthermore, the second workday setting 2211 is from Monday to Friday, the second non-workday setting 2212 is from Saturday to Sunday, and the second full-week setting 2213 is from Monday to Sunday. Specifically, a short press is made on the third toggle button 65 or the fourth toggle button 66 to select different settings. After a setting is selected, a short press is made again on the third toggle button 65 or the fourth toggle button 66 to select time and stay for 3 seconds, thereby completing the setting of the second working mode 22.

In this embodiment, the alarm clock further includes a speaker 11. The speaker 11 is electrically connected to the control main board 1 and the short-distance wireless communication module 3. The speaker 11 is configured for playing an audio file. When the toggle button group 6 is triggered to be in the fourth working state 62, the first toggle button 63 and the second toggle button 64 are respectively used for adjusting sound volume emitted by the speaker 11. Through the above structure, when the alarm clock is wirelessly connected to the external electronic device via the short-distance wireless communication module 3, the control main board can control the speaker 11 to play the audio file, such as playing music or audio from the mobile phone, the tablet, the computer, or the television. Moreover, after a short press is made on the first toggle button 63 to enter the fourth working state, the sound volume emitted by the speaker 11 can be adjusted via the first toggle button 63 or the second toggle button 64, achieving the multifunctionality of the alarm clock and bringing the user a more intelligent and convenient life experience.

In this embodiment, the alarm clock further includes a light-emitting element 7 and a touch switch 12. The touch switch 12 is electrically connected to the control main board 1, and the touch switch 12 is used for controlling brightness of the light-emitting element 7. Through the above structure, the alarm clock further includes the light-emitting element 7, so that the alarm clock is not only used as an alarm clock, but also as a lighting device for emitting lighting rays. The light-emitting element is turned on or turned off through the touch switch 12, making it easy to operate and improving the multifunctionality of the alarm clock.

In this embodiment, the light-emitting element 7 is equipped with three levels of brightness. When the touch switch 12 is touched for the first time, the light-emitting element 7 is turned on at a first level of brightness. When the touch switch 12 is touched for the second time, the light-emitting element 7 is turned on at a second level of brightness. When the touch switch 12 is touched for the third time, the light-emitting element 7 is turned on at a third level of brightness. When the touch switch 12 is touched for the fourth time, the light-emitting element 7 is turned off. Through the above structure, the touch switch 12 is easy and intuitive to operate. The user only needs to lightly touch a surface of the touch switch 12 to control the light-emitting element 7. The design of the three levels of brightness allows the user to adjust the brightness of the light according to a need, so that the user can select appropriate brightness according to different situations and personal preferences, thereby reducing eye fatigue and providing a more comfortable reading and working environment.

In this embodiment, the alarm clock further includes an LED display screen 13. The LED display screen 13 is electrically connected to the control main board 1. When the power button 5 is triggered to be in the second working state 52, the power button 5 can be used for turning on or turning off the LED display screen 13 and adjusting brightness of the LED display screen 13. Specifically, a long press is made on the power button 5 to enter the second working state 52 to adjust the brightness of the LED display screen 13.

In this embodiment, the alarm clock includes a base 8. The base 8 is connected to a lamp post 71. One end of the lamp post 71 is connected to the base 8, and an opposite end of the lamp post 71 is connected to a bulb base 72. The bulb base 72 is connected to a bulb 73, and the light-emitting element 7 is arranged inside the bulb 73. The lamp post 71 is connected to the base 8 and the bulb base 72 through threaded connection to increase the stability of the desk lamp.

In this embodiment, the control main board 1 is installed inside the base 8, and the LED display screen 13 is installed on an outer side wall of the base 8. The speaker 11 is installed on an upper surface of the base 8. The base 8 is further provided with a USB power interface 14 and a Type-C power interface 15. The USB power interface 14 and the Type-C power interface 15 are positioned on the outer side wall of the base 8.

In this embodiment, the alarm clock further includes a lampshade 74 and a lamp cap nut 75. The lamp cap nut 75 is configured for fixedly connecting the lampshade 74 to the bulb base 72. The bulb 73 is detachably plugged into the bulb base 72 through threaded connection. The lampshade 74 encloses the bulb base 72 and the bulb 73. The lampshade is a transparent lampshade.

In this embodiment, the lampshade 74 is internally connected with a plurality of connecting rods 76. One end of each of the connecting rods 76 is fixedly connected to the lampshade 74, and an opposite end of each of the connecting rods 76 is connected to a connecting structure 77. The connecting structure 77 includes two layers of annular fixing pieces 771. The connecting rods 76 are fixedly connected between the two layers of annular fixing pieces 771. The connecting structure 77 can be sleeved and connected to the bulb base 72. The connecting structure 77 is fixedly installed on the bulb base 72 through threaded connection via the lamp cap nut 75, so that the lampshade 74 is connected to the bulb base 72 and encloses the bulb base 72 and the bulb 73.

In this embodiment, the bulb base 72 is equipped with a flange 721. When the connecting structure 77 sleeves the bulb base 72, bottom surfaces of the two layers of annular fixing pieces 771 are connected to a surface of the flange 721, so that the lampshade 74 can be fixedly connected to the bulb base 72. Through the above structure, the user can first sleeve the bulb base 72 with the connecting structure 77, and then arrange the lamp cap nut 75 above the two layers of annular fixing pieces 771 in a sleeving manner. The lamp cap nut 75 is in threaded connection with the bulb base 72, so that the lamp cap nut 75 can fix the two layers of annular fixing pieces 771 between the lamp cap nut 75 and the bulb base 72. The flange 721 is configured for supporting the two layers of annular fixing pieces 771, so as to prevent the two layers of annular fixing pieces 771 from sliding down from the bulb base 72, thereby enabling the lampshade 74 to be fixedly connected to the bulb base 72. The design is simple and ingenious.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. An alarm clock comprising:

a control main board;

an alarm clock module, the alarm clock module being electrically connected to the control main board, the alarm clock module comprising at least one alarm clock setting for giving at least one time alarm;

a short-distance wireless communication module, the short-distance wireless communication module being electrically connected to the control main board, and the short-distance wireless communication module being configured for wireless connection with an external electronic device; and a clock module, the clock module being configured for displaying time, the clock module being electrically connected to the control main board and the short-distance wireless communication module, and the clock module being wirelessly connected to the external electronic device via the short-distance wireless communication module for automatic time calibration, thereby calibrating the at least one time alarm;

wherein the alarm clock module comprises at least two working modes, and the alarm clock further comprises a toggle button group, the toggle button group is electrically connected to the control main board and the alarm clock module, and the toggle button group comprises a third working state and a fourth working state;

wherein the toggle button group comprises a first toggle button and a second toggle button; and the at least two working modes comprise a first working mode and a second working mode; when the toggle button group is triggered to be in the third working state, the first toggle button is used for switching to the first working mode, and the second toggle button is used for switching to the second working mode.

2. The alarm clock of claim 1, wherein the short-distance wireless communication module comprises a WiFi connection module, a Bluetooth connection module, an infrared connection module, a ZigBee connection module, or an NFC connection module.

3. The alarm clock of claim 1, wherein the alarm clock comprises a power button, the power button is electrically connected to the control main board, and the power button comprises a first working state and a second working state.

4. The alarm clock of claim 3, wherein when the power button is triggered to be in the first working state, the power button is used for controlling the clock module to be turned on and turned off; and when the clock module is turned on, the clock module is wirelessly connected to the external electronic device via the short-distance wireless communication module to achieve automatic time calibration.

5. The alarm clock of claim 1, wherein the toggle button group further comprises a third toggle button and a fourth toggle button; the first working mode comprises at least two first alarm clock settings; the first alarm clock settings comprise a first workday setting and a first non-workday setting; and the third toggle button and the fourth toggle button are used for switching different alarm clock settings of the first working mode.

6. The alarm clock of claim 5, wherein the second working mode comprises at least two second alarm clock settings; the second alarm clock settings comprise a second workday setting and a second non-workday setting; and the third toggle button and the fourth toggle button are used for switching different alarm clock settings of the second working mode.

7. The alarm clock of claim 1, wherein the alarm clock further comprises a toggle button group and a speaker; the toggle button group is electrically connected to the control main board and the alarm clock module; the speaker is electrically connected to the control main board and the short-distance wireless communication module, and the speaker is configured for playing an audio file; when the toggle button group is triggered to be in a working state, the toggle button group is used for adjusting sound volume emitted by the speaker.

8. The alarm clock of claim 7, wherein the alarm clock further comprises a light-emitting element and a touch switch; the touch switch is electrically connected to the control main board, and the touch switch is used for controlling brightness of the light-emitting element.

9. The alarm clock of claim 8, wherein the light-emitting element is equipped with three levels of brightness; when the touch switch is touched for the first time, the light-emitting element is turned on at a first level of brightness; when the touch switch is touched for the second time, the light-emitting element is turned on at a second level of brightness; when the touch switch is touched for the third time, the light-emitting element is turned on at a third level of brightness; and when the touch switch is touched for the fourth time, the light-emitting element is turned off.

10. An alarm clock comprising:

a control main board;

an alarm clock module, the alarm clock module being electrically connected to the control main board, the alarm clock module comprising at least one alarm clock setting for giving at least one time alarm;

a short-distance wireless communication module, the short-distance wireless communication module being electrically connected to the control main board, and the short-distance wireless communication module being configured for wireless connection with an external electronic device; and a clock module, the clock module being configured for displaying time, the clock module being electrically connected to the control main board and the short-distance wireless communication module, and the clock module being wirelessly connected to the external electronic device via the short-distance wireless communication module for automatic time calibration, thereby calibrating the at least one time alarm;

wherein the alarm clock comprises a power button, the power button is electrically connected to the control main board, and the power button comprises a first working state and a second working state;

wherein the alarm clock further comprises an LED display screen; the LED display screen is electrically connected to the control main board; and when the power button is triggered to be in the second working state, the power button can be used for turning on or turning off the LED display screen and adjusting brightness of the LED display screen.

11. The alarm clock of claim 1, wherein the alarm clock comprises a light-emitting element, a touch switch and a base; the touch switch is electrically connected to the control main board, and the touch switch is used for controlling brightness of the light-emitting element, the base is connected to a lamp post, one end of the lamp post is connected to the base, and an opposite end of the lamp post is connected to a bulb base; the bulb base is connected to a bulb, and the light-emitting element is arranged inside the bulb.

12. The alarm clock of claim 11, wherein the control main board is installed inside the base, the LED display screen is installed on an outer side wall of the base, and the speaker is installed on an upper surface of the base.

13. The alarm clock of claim 11, wherein the base is further provided with a USB power interface and a Type-C power interface; and the USB power interface and the Type-C power interface are positioned on the outer side wall of the base.

14. The alarm clock of claim 11, wherein the alarm clock further comprises a lampshade and a lamp cap nut; the lamp cap nut is configured for fixedly connecting the lampshade to the bulb base, the bulb is detachably plugged into the bulb base through threaded connection, and the lampshade encloses the bulb base and the bulb.

15. An alarm clock comprising:

a control main board;

an alarm clock module, the alarm clock module being electrically connected to the control main board, the alarm clock module comprising at least one alarm clock setting for giving at least one time alarm;

a short-distance wireless communication module, the short-distance wireless communication module being electrically connected to the control main board, and the short-distance wireless communication module being configured for wireless connection with an external electronic device; and a clock module, the clock module being configured for displaying time, the clock module being electrically connected to the control main board and the short-distance wireless communication module, and the clock module being wirelessly connected to the external electronic device via the short-distance wireless communication module for automatic time calibration, thereby calibrating the at least one time alarm;

wherein the alarm clock comprises a light-emitting element, a touch switch and a base; the touch switch is electrically connected to the control main board, and the touch switch is used for controlling brightness of the light-emitting element, the base is connected to a lamp post, one end of the lamp post is connected to the base, and an opposite end of the lamp post is connected to a bulb base; the bulb base is connected to a bulb, and the light-emitting element is arranged inside the bulb;

wherein the alarm clock further comprises a lampshade and a lamp cap nut; the lamp cap nut is configured for fixedly connecting the lampshade to the bulb base, the bulb is detachably plugged into the bulb base through threaded connection, and the lampshade encloses the bulb base and the bulb; and wherein the lampshade is internally connected with a plurality of connecting rods; one end of each of the connecting rods is fixedly connected to the lampshade, and an opposite end of each of the connecting rods is connected to a connecting structure; the connecting structure comprises two layers of annular fixing pieces; the connecting rods are fixedly connected between the two layers of annular fixing pieces, the connecting structure can be sleeved and connected to the bulb base, and the connecting structure is fixedly installed on the bulb base through threaded connection via the lamp cap nut, so that the lampshade is connected to the bulb base and encloses the bulb base and the bulb.

16. The alarm clock of claim 15, wherein the bulb base is equipped with a flange, and when the connecting structure sleeves the bulb base, bottom surfaces of the two layers of annular fixing pieces are connected to a surface of the flange, so that the lampshade can be fixedly connected to the bulb base.

* * * * *